United States Patent [19]

McSorley, Sr.

[11] Patent Number: 4,843,251
[45] Date of Patent: Jun. 27, 1989

[54] ENERGY STORAGE AND SUPPLY SYSTEM

[76] Inventor: Harry J. McSorley, Sr., 1717 S. Washington, Wichita, Kans. 67211

[21] Appl. No.: 172,161

[22] Filed: Mar. 23, 1988

[51] Int. Cl.$^4$ .................. H02J 7/00; H01M 10/44
[52] U.S. Cl. .................................. 307/66; 320/15
[58] Field of Search .............. 307/66, 80, 81; 320/15, 320/6, 19

[56] References Cited

U.S. PATENT DOCUMENTS

| | | | |
|---|---|---|---|
| 979,155 | 12/1910 | Gugler | 320/6 |
| 3,577,003 | 5/1971 | Behr et al. | 307/66 |
| 3,631,257 | 12/1971 | Behr et al. | 307/66 |
| 4,044,268 | 8/1977 | Hammel et al. | 307/66 |
| 4,101,787 | 7/1978 | Vail | 307/81 |
| 4,177,389 | 12/1979 | Schott | 307/64 |
| 4,323,788 | 4/1982 | Smith | 307/66 |
| 4,345,197 | 8/1982 | Wheadon et al. | 320/6 |
| 4,413,220 | 11/1983 | Waineo | 320/15 |
| 4,559,456 | 12/1985 | Yamamoto et al. | 307/66 |
| 4,638,176 | 1/1987 | Martinelli | 307/64 |
| 4,651,020 | 3/1987 | Kenny et al. | 307/43 |
| 4,694,237 | 9/1987 | Hanson | 320/6 |

*Primary Examiner*—William M. Shoop, Jr.
*Assistant Examiner*—Sharon D. Logan
*Attorney, Agent, or Firm*—Henderson & Sturm

[57] ABSTRACT

An energy storage and supply system wherein an alternating current energy source connects through chargers such that one or the other of two battery banks are continuously being charged. The bank not being currently charged provides direct current energy to inverters that convert the energy into an alternating current output. The charging/energy output cycle of the battery banks can be controlled by a timer.

8 Claims, 3 Drawing Sheets

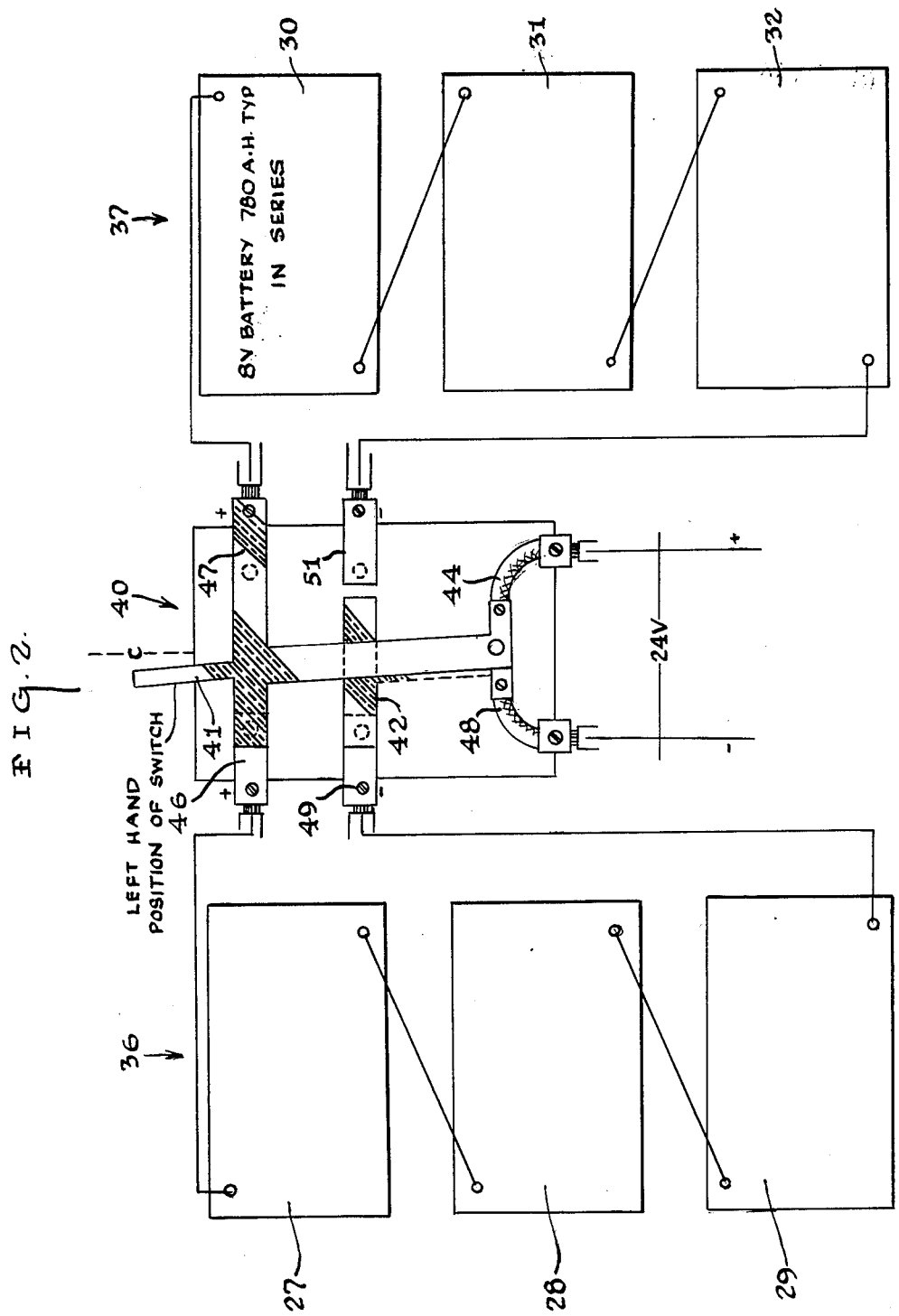

ENERGY STORAGE AND SUPPLY SYSTEM

BACKGROUND ART

Various methods for producing electrical energy are known. For example, electrical energy can be generated by causing a conductor to move with respect to a magnetic field, thereby inducing a flow of current through the conductor. Various energy sources are used to cause such motion, including hydropower, nuclear power, and the energy made available during the combustion of fossil fuels.

Regardless of how produced, such energy is generally supplied to most residential, commercial and industrial users in alternating current form, and generally in multiples of approximately 120 volts. With the above supply system in place, standards have arisen that ensure compatible wiring of buildings to provide electricity where needed, and that allow a multitude of appliances and devices to be powered thereby.

Despite many attendant advantages of the above described system, certain problems remain. For example, interruption of the supply of electrical energy to a building will generally leave the building without electricity. In preparation for such occurrences, one must either be prepared with alternate electrical sources (such as gasoline powered generators or battery powered appliances) or other alternate energy sources (such as using combustible fossil fuel for heat and light.)

These alternative sources, of course, give rise to different problems. Fuel to power the alternate source may not be available when needed, and a switch over to the alternate source generally does not occur automatically in response to need. On the other hand, use of such alternative sources for constant service engender significantly greater cost than that represented by use of the electrical energy generally provided by local utilities.

A need therefore exists for an electrical energy supply system that will make use of ordinarily supplied power when it is available, and that will ordinarily be available during at least most power outages. Further, such a system should provide such service when needed without direct human intervention.

DISCLOSURE OF THE INVENTION

These needs and others are substantially met through provision of the energy storage and supply system described herein. This system includes, in general, an input for connecting to an appropriate source of electrical energy, such as 120 volt alternating current as ordinarily provided by local electric utilities. This input connects to a charger that converts the alternating current into an appropriate DC charging output that can be provided, selectively, to either of two storage units, comprised, in at least one embodiment, of a plurality of batteries. The system also includes an output that can include inverters for converting DC energy from the batteries back into alternating current at an appropriate voltage level.

Importantly, the invention also includes a switch for controlling which of the two storage units is connected to the charger, and which is connected to the output for providing electrical energy to the building. In one embodiment, a timer controls this switch such that the switch cycles back and forth between the units so that one of the storage units will always be charging while another storage unit will always provide electric power for use as needed.

Through provision of this system, when power is interrupted, the supply of energy from the storage units will continue unabated, at least until both storage units have been fully depleted. Ordinarily, power will be restored in sufficient time to minimize this problem. Also, no human intervention is required to accommodate power outages, since the system functions to always provide an energy output as derived from one of the battery structures.

Also, depending upon the application, the input to this system can be provided from alternative energy sources, such as wind powered generators and solar cells.

BRIEF DESCRIPTION OF THE DRAWINGS

These and other attributes of the invention will become more clear upon making a thorough review and study of the following description of the best mode for carrying out the invention, particularly when reviewed in conjunction with the drawings, wherein:

FIG. 2 comprises a block diagram depiction of another portion of the invention;

BEST MODE FOR CARRYING OUT THE INVENTION

Figure 1:
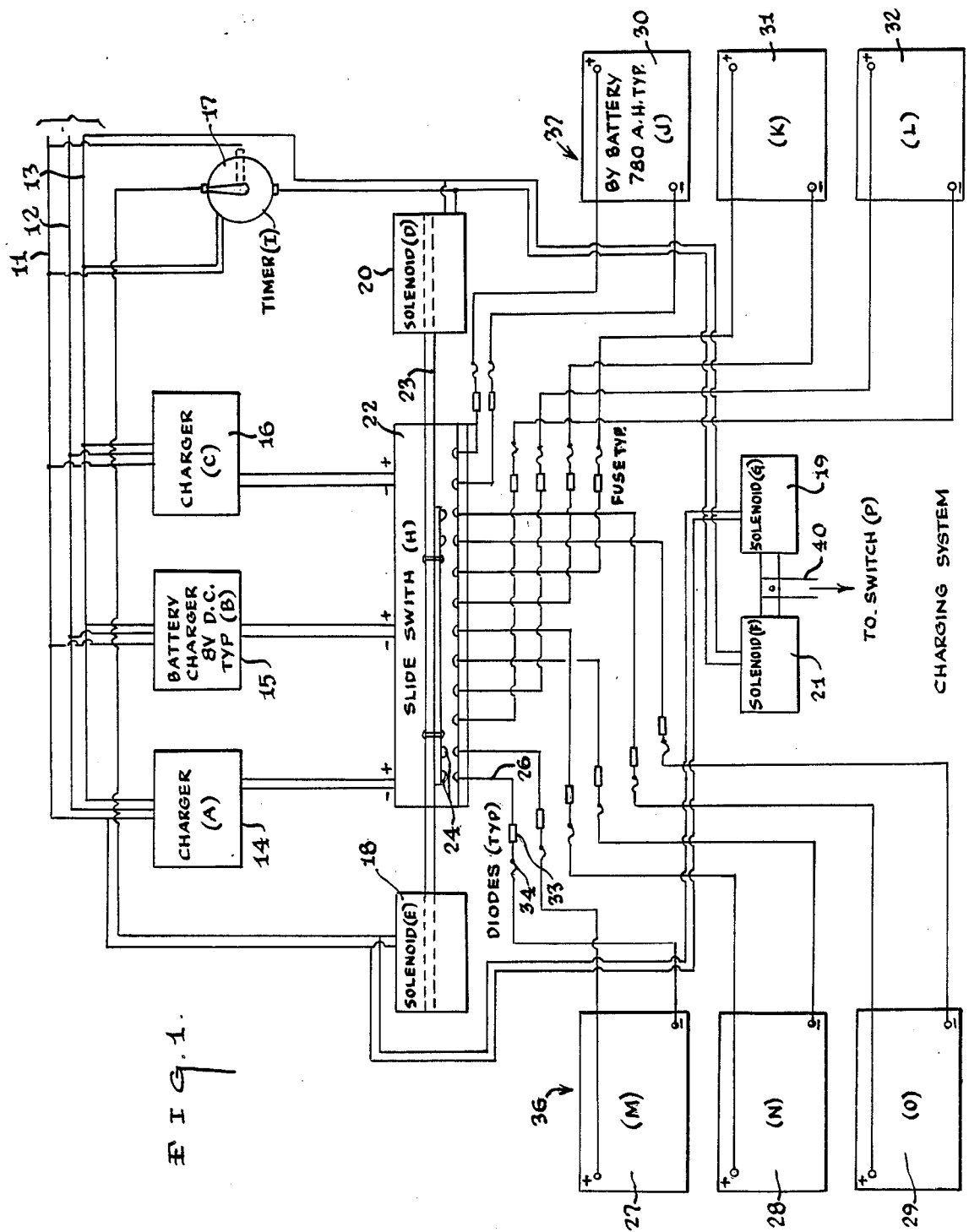
FIG. 1 comprises a block diagram depiction of a portion of the invention.

Referring to the drawings, and in particular to FIG. 1, the invention will now be described.

An appropriate plurality of conductors (11, 12, and 13) comprise an input unit that can connect to an appropriate source of electrical energy, such as a standard 120 volt alternating current source as found in most residential, commercial, and industrial settings. These conductors (11–13) each connect to one of three battery chargers (14, 15, and 16) as appropriate to the particular application. In this particular embodiment, it may be assumed that the output of each charger (14–16) comprises an 8 volt direct current charger signal.

Two of the conductors (11 and 13) also connect to a timer (17), the function of which will be described in more detail below. In addition, another of the conductors (11) connects to each of two solenoids (18 and 19) which comprise a part of the overall switch structure for the invention, and another of the conductors (13) connects to each of another pair of solenoids (20 and 21). The function of these solenoids (18–21) will also be described in more detail below.

The outputs of each charger (14–16) connect to a slide switch structure (22) as well understood in the art. In this particular slide switch (22), an insulating control stem (23) extends through the slide switch (22) and is operably associated with two of the solenoids (18 and 20). So positioned, the location of the stem (23) can be controlled by selective energization of the two solenoids (18 and 20). Attached to the stem (23) are conductors (24) that electrically mate with an opposing pair of conductors (26) located within the slide switch housing (22). Each pair of conductors (24) on the movable stem (23) are associated with the output of one of the chargers (14–16). Each pair of conductors (26) mounted to the slide switch housing (22) are associated with the power terminals of a battery (27–32).

Therefore, by selective control of the position of the stem (23) through appropriate control of the solenoids (18 and 20), the slide switch (22) determines which of the batteries (27–32) are connected to the chargers (14–16) and which are not. Those batteries which are connected to the charges, of course, will tend to become charged.

To provide appropriate protection, a diode (33) and fuse (34) can be connected in series between each slide switch conductor (26) and battery power terminal as well understood in the art.

The batteries (27 and 32) are segregated into two banks. The first bank constitutes a first storage unit (36) and the second group of batteries (30–32) comprises a second storage unit (37). It can be seen that the slide switch (22) functions to allow all of the batteries (27–29) or (30–32) of one of the storage units (36 or 37) to be charged at the same time. Also, it can be seen that the slide switch (22) functions to connect each battery to one charger, and that each battery charges independently of the other batteries associated with it in the storage unit (36 or 37).

Figure 3:
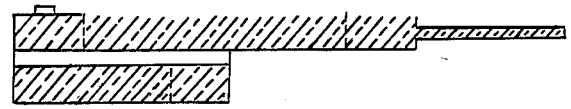
FIG. 3 comprises a side elevational detailed view of a switch as depicted in FIG. 2.

Also depicted in FIG. 1 are two solenoids (19 and 21) that control a second switch structure that will now be described with reference to FIG. 2. This second switch can be seen as generally depicted by the numeral 40 and includes a top conductive member (41) and a lower conductive member (42). The two conductive members are separated by an appropriate insulator (43) (as depicted in FIG. 3). The upper conductor (41) allows electrical connections to be made between an output conductor (44) (comprised, for example, of braided copper) and either of two conductive terminals (46 and 47). The latter two conductive terminals (46 and 47) are associated with the positive power terminals of the batteries (27–29 or 30–32) associated with either the first or second storage unit (36 or 37). The lower conductor (42) similarly connects another output conductor (48) (comprised, for example, of braided copper) to either of two terminal conductors (49 and 51) that similarly connect to the negative terminals of the batteries of the first storage unit (36) or the second storage unit (37).

As depicted in FIG. 1, the second switch (40) can also be made responsive to the energized states of the two solenoids (19 and 21) depicted therein, such that the output conductors (44 and 48) are either connected to all of the batteries, in series, of the first storage unit (36) or all of the batteries of the second storage unit (37).

Figure 4:
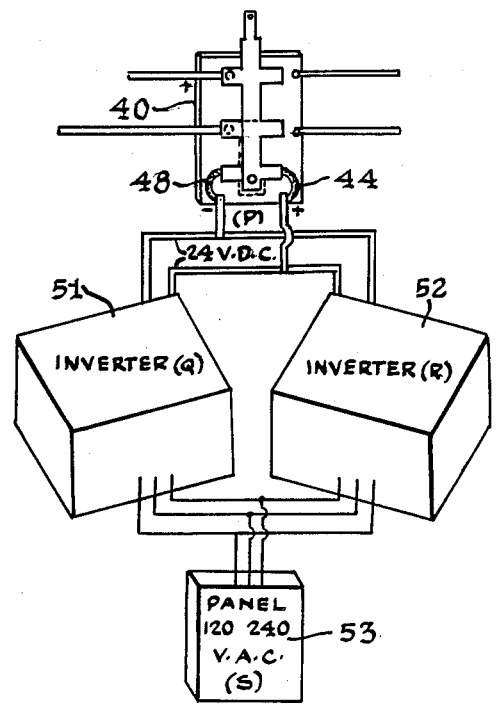
FIG. 4 comprises a block diagram view of yet another portion of the invention.

With reference to FIG. 4, these output conductors (44 and 48) can be connected to provide 24 volt direct current to two inverters (51 and 52) as well understood in the art, to thereby provide at the outputs thereof 120 volt (or 240 volt, as may be appropriate to a particular application) alternating current (53) that can be used in a normal way in a building having standard wiring.

The timer (17) depicted in FIG. 1 functions to control the solenoids (18–21) to thereby control the positioning of the slide switch (22) and the second switch (40) to thereby control which of the storage units (36 and 37) are being charged and which are being used to supply power through the inverters (51 and 52) to the output (53). By appropriate duty cycle control, one can be assured of a constantly available source of electrical energy, even during power outages, so long as the outage does not last longer than the storage capacity of all available storage units.

Those skilled in the art will recognize that various modifications could be made to the described embodiment without departing from the spirit of the invention. It should therefore be understood that such modifications are not to be considered as outside the scope of the claims unless specific limitations directed to such modifications are included in such claims.

I claim:

1. An energy storage and supply system comprising:
   input means for connecting to a source of electrical energy;
   first storage means for storing electrical energy;
   second storage means for storing electrical energy;
   output means for providing stored electrical energy to a load;
   charging means operably connected to said input means for providing an electrical charging output that may be stored; and,
   switch means for controlling
      which of said first and second storage means is connected to said charging means; and which of said first and second storage means is connected to said output means for allowing electrical energy to be supplied to said load, such that one of the storage means is always connected to said charging means and another of said storage means is always connected to said output means; wherein, said switch means includes a slide switch for controlling which of said storage means is connected to said charging means.

2. The energy storage and supply system of claim 1 wherein said input means connects to a source of alternating current electrical energy.

3. The energy storage and supply system of claim 1 wherein:
   said first and second storage means provide direct current electrical energy to said output means when connected thereto; and
   said output means includes inverter means for converting said direct current electrical energy into alternating current electrical energy.

4. The energy storage and supply system of claim 1 wherein said first storage means comprises at least one battery.

5. The energy storage and supply system of claim 1 wherein said second storage means comprises at least one battery.

6. The energy storage and supply system of claim 1 wherein said first storage means comprises a plurality of batteries.

7. The energy storage and supply system of claim 1 wherein said second storage means comprises a plurality of batteries.

8. The energy storage and supply system of claim 1 wherein said first and second storage means comprise a plurality of batteries.

* * * * *